US011473918B2

(12) United States Patent
Körner

(10) Patent No.: US 11,473,918 B2
(45) Date of Patent: Oct. 18, 2022

(54) SYSTEM FOR DETERMINING A RISK OF AN ACCIDENT ON A DRIVING ROUTE

(71) Applicant: Continental Automotive GmbH, Hannover (DE)

(72) Inventor: Rene Alexander Körner, Munich (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 327 days.

(21) Appl. No.: 16/781,584

(22) Filed: Feb. 4, 2020

(65) Prior Publication Data
US 2020/0256687 A1   Aug. 13, 2020

(30) Foreign Application Priority Data

Feb. 7, 2019   (DE) ..................... 10 2019 201 563.8

(51) Int. Cl.
*G01C 21/34*   (2006.01)
*G01C 21/36*   (2006.01)

(52) U.S. Cl.
CPC ..... *G01C 21/3415* (2013.01); *G01C 21/3461* (2013.01); *G01C 21/3484* (2013.01); *G01C 21/3492* (2013.01); *G01C 21/3691* (2013.01)

(58) Field of Classification Search
CPC ............ G01C 21/3691; G01C 21/3492; G01C 21/3484; G01C 21/3461; G01C 21/3415
(Continued)

(56) References Cited

U.S. PATENT DOCUMENTS 8,126,641 B2 * 2/2012 Horvitz .............. G01C 21/3415
701/425
8,521,407 B2 * 8/2013 Haynes, III ........ G01C 21/3492
701/414
(Continued)

FOREIGN PATENT DOCUMENTS

DE   10 2010 049 721 A1   4/2012   ............ B60W 30/08
DE   10 2018 006 223 A1   1/2019   ............ B60W 30/08
(Continued)

OTHER PUBLICATIONS

German Office Action, Application No. 10 2019 201 563.8, 7 pages, dated Nov. 14, 2019.
(Continued)

*Primary Examiner* — Yazan A Soofi
(74) *Attorney, Agent, or Firm* — Slayden Grubert Beard PLLC

(57) ABSTRACT

Various embodiments include a system for determining a risk of an accident on a driving route comprising: a memory storing route risk parameters of the driving route, wherein at least one of the route risk parameters is assigned to route sections of the driving route, wherein each of the route risk parameters contains information relevant for road safety on the respective route section; and a processor in communication with the memory, programmed to determine a respective risk factor for each of the route risk parameters, wherein the respective risk factor indicates a measure of a risk of an accident on the respective assigned route section. The processor determines a total risk index of the driving route based on the respective risk factor of the respective risk parameter assigned to the respective route section, wherein the total risk index measures risk of an accident on the driving route.

8 Claims, 3 Drawing Sheets

(58) Field of Classification Search
USPC .......................................................... 701/414
See application file for complete search history.

(56) References Cited

U.S. PATENT DOCUMENTS

| | | | |
|---|---|---|---|
| 9,551,580 B2 * | 1/2017 | Konig | H04L 45/123 |
| 9,574,888 B1 * | 2/2017 | Hu | G01C 21/3484 |
| 10,042,359 B1 | 8/2018 | Konrardy et al. | |
| 2005/0222764 A1 * | 10/2005 | Uyeki | G08G 1/096811 |
| | | | 701/414 |
| 2008/0033644 A1 * | 2/2008 | Bannon | G06F 16/29 |
| | | | 701/414 |
| 2016/0189306 A1 * | 6/2016 | Bogovich | H04W 4/029 |
| | | | 705/4 |
| 2017/0234689 A1 * | 8/2017 | Gibson | G01C 21/3492 |
| | | | 701/25 |
| 2018/0299284 A1 * | 10/2018 | Wang | G01C 21/3694 |

FOREIGN PATENT DOCUMENTS

| | | | | |
|---|---|---|---|---|
| GB | 2555221 A | 4/2018 | ............. | G01C 21/34 |
| WO | 2021/113475 A1 | 6/2021 | ............. | G06F 17/10 |

OTHER PUBLICATIONS

Great Britain Office Action, Application No. 2001307.4, 4 pages, dated Aug. 6, 2021.
Great Britain Office Action, Application No. 2001307.4, 9 pages, dated Sep. 25, 2020.

* cited by examiner

SYSTEM FOR DETERMINING A RISK OF AN ACCIDENT ON A DRIVING ROUTE

CROSS-REFERENCE TO RELATED APPLICATIONS

This application claims priority to DE Application No. 10 2019 201 563.8 filed Feb. 7, 2019, the contents of which are hereby incorporated by reference in their entirety.

TECHNICAL FIELD

The present disclosure relates to driving and transportation. Various embodiments may include systems for determining a risk of an accident on a driving route and/or methods for determining a risk of an accident on a driving route.

BACKGROUND

At present, navigation systems or backend systems calculate routes or route options taking into account specific route criteria. For example, the quickest route or the most fuel-efficient route can be selected as a route option and then calculated. Specific preferences, for example avoiding toll routes, avoiding ferries, avoiding driving on highways etc., can be selected as additional route criteria. It is critical for including these route criteria to identify a route section on which the conditions to be parameterized prevail.

Selection of a route where the risk of an accident is minimized would be valuable for specific markets and consumers. A driver who places particular value on personal safety may, for example, prefer a route which requires a longer driving time but in the case of which the risk of an accident is considerably lower than on the quickest driving route. Furthermore, subsequent monetary costs could be avoided by selecting a route where the risk of an accident is minimized. It is likewise conceivable for an insurance company to offer favorable insurance policies if a driver deliberately selects the driving route with the lowest risk of an accident for a number of journeys. Furthermore, taking into account driving routes with a minimized risk of an accident is of interest in the field of application of automated driving which will become more and more important in the future. In order to determine the driving route with the lowest risk of an accident between a start point and a destination point, it is necessary to determine a risk of an accident or a probability of an accident on a driving route.

SUMMARY

The teachings of the present disclosure describe systems with which it is possible to determine the risk of an accident on a driving route in a time-dependent manner as accurately as possible. Teachings of the present invention also describe methods with which it is possible to determine a risk of an accident on a driving route in a time-dependent manner as accurately as possible. For example, some embodiments include a system for determining a risk of an accident on a driving route, comprising: a memory device (10) for storing route risk parameters (11) of the driving route (FS), wherein at least one of the route risk parameters (11) is assigned to route sections (A1, A2, A3, ..., An) of the driving route (FS), wherein each of the route risk parameters (11) contains an item of information which is relevant for road safety on the respective route section (A1, A2, A3, ..., An), a computer device (20) for determining a respective risk factor for each of the route risk parameters (11), wherein the respective risk factor indicates a measure of a risk of an accident on the respective route section (A1, A2, A3, ..., An) to which the respective route risk parameter (11) is assigned, wherein the computer device (20) is designed to determine a total risk index of the driving route (FS) depending on the respective risk factor of the respective at least one route risk parameter (11) which is assigned to the respective route section (A1, A2, A3, ..., An), wherein the total risk index indicates a measure of a risk of an accident on the driving route (FS).

In some embodiments, the memory device (10) is designed to store static route risk parameters (11s) and dynamic route risk parameters (11d), wherein the respective item of information, which is relevant for road safety, of the respective static route risk parameter (11s) remains unchanged over a first time period, and wherein the respective item of information, which is relevant for road safety, of the respective dynamic route risk parameter (11d) remains unchanged over a second time period, wherein the second time period is shorter than the first time period.

In some embodiments, the static route risk parameters (11s) contain information relating to a radius of a bend, an intersection, a number of turn-offs required, crossing of driving lanes by road users, accident hotspots, warning signs and/or wooded areas in the respective route section (A1, A2, A3, ..., An).

In some embodiments, the dynamic route risk parameters (11d) contain information relating to the prevailing weather conditions, the frequency of wild animals crossing, a current volume of traffic on the respective route section (A1, A2, A3, ..., An).

In some embodiments, the computer device (20) is designed to determine the total risk index of the driving route (FS) depending on a time of day and/or on a time of year.

In some embodiments, the computer device (20) is designed to determine the total risk index of the driving route (FS) depending on a driving characteristic of a driver.

In some embodiments, the computer device (20) is designed to determine a different driving route if the total risk index of the driving route (FS) lies above a predefined threshold value.

As another example, some embodiments include a method for determining a risk of an accident on a driving route, comprising: storing route risk parameters (11) of the driving route (FS), wherein at least one of the route risk parameters (11) is assigned to route sections (A1, A2, A3, ..., An) of the driving route (FS), wherein each of the route risk parameters (11) contains an item of information which is relevant for road safety on the respective route section (A1, A2, A3, ..., An), determining a respective risk factor for each of the route risk parameters (11), wherein the respective risk factor indicates a measure of a risk of an accident on the respective route section (A1, A2, A3, ..., An) to which the respective route risk parameter (11) is assigned, and determining a total risk index for the driving route (FS) depending on the respective risk factor of the respective at least one route risk parameter (11) which is assigned to the respective route section (A1, A2, A3, ..., An), wherein the total risk index indicates a measure of a risk of an accident on the driving route (FS).

In some embodiments, the method further includes storing static route risk parameters (11s) and dynamic route risk parameters (11d), wherein the respective item of information, which is relevant for road safety, of the respective static route risk parameter (11s) remains unchanged over a first time period, and wherein the respective item of information, which is relevant for road safety, of the respective dynamic route risk parameter (11*d*) remains unchanged over a second time period, wherein the second time period is shorter than the first time period.

In some embodiments, the method further includes: determining the total risk index of the driving route (FS) depending on a driving characteristic of a driver, and/or determining a different driving route if the total risk index of the driving route (FS) lies above a predefined threshold value.

BRIEF DESCRIPTION OF THE DRAWINGS

The teachings of the present disclosure are described below with reference to figures which show embodiments of a system for determining a risk of an accident on a driving route and with which the corresponding method for determining the risk of an accident on a driving route is clearly explained. In the figures.

DETAILED DESCRIPTION

Figure 1:
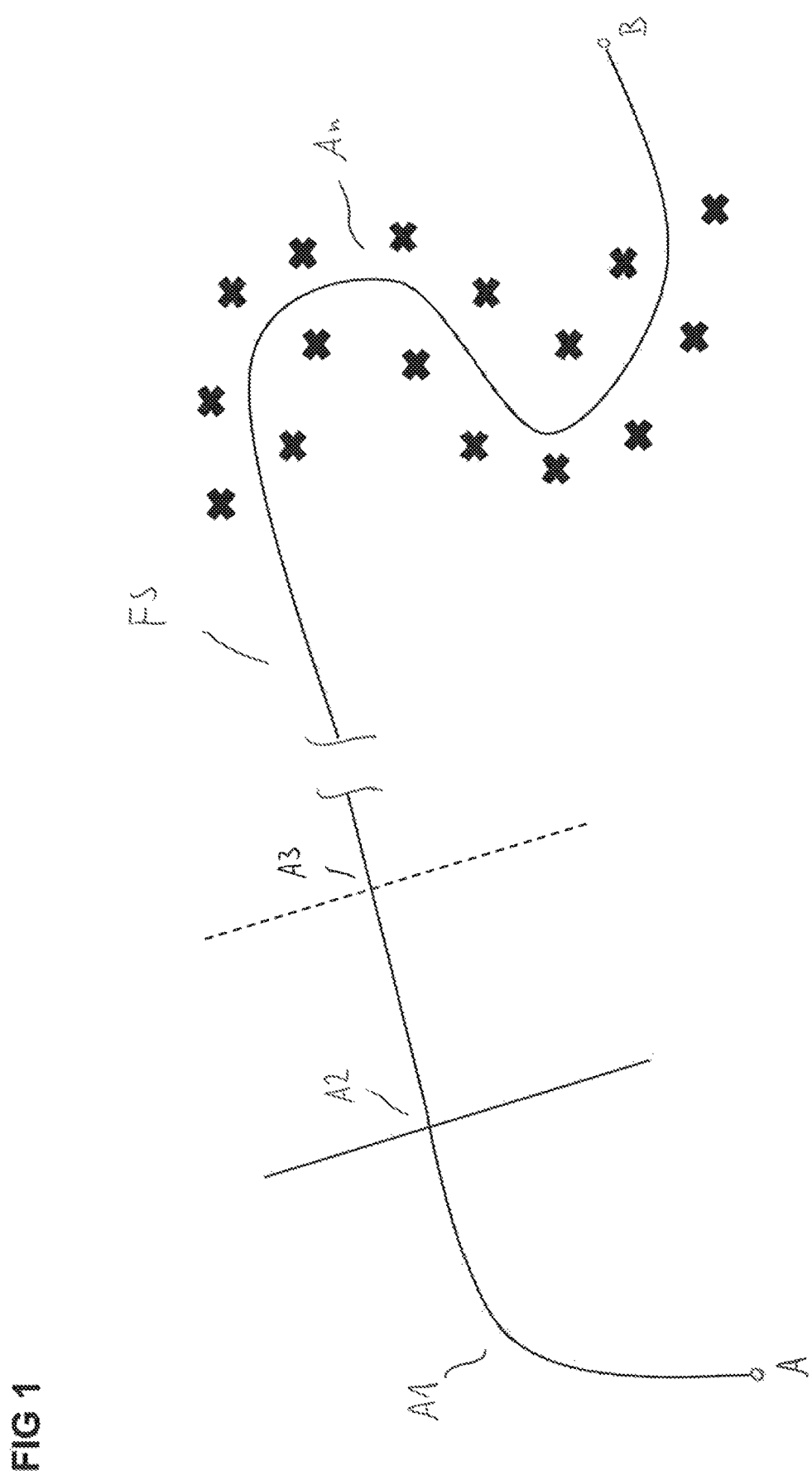
FIG. 1 shows a driving route on which a prevailing risk of an accident is to be determined.

Various embodiments of the teachings herein may include a system comprising a memory device for storing route risk parameters of the driving route, wherein at least one of the route risk parameters is assigned to route sections of the driving route. Each of the route risk parameters contains an item of information which is relevant for road safety on the respective route section. The system furthermore comprises a computer device for determining a respective risk factor for each of the route risk parameters. In this case, the respective risk factor indicates a measure of a risk of an accident on the respective route section to which the respective route risk parameter is assigned. The computer device is designed to determine a total risk index of the driving route depending on the respective risk factor of the respective at least one route risk parameter which is assigned to the respective route section. The total risk index indicates a measure of a risk of an accident on the driving route.

Some embodiments include a method which allows a risk of an accident prevailing on a driving route at a specific time to be determined or estimated. In some embodiments, a method for determining a risk of an accident on a driving route comprises the following steps:

storing route risk parameters of the driving route, wherein at least one of the route risk parameters is assigned to route sections of the driving route, wherein each of the route risk parameters contains an item of information which is relevant for road safety on the respective route section, determining a respective risk factor for each of the route risk parameters, wherein the respective risk factor indicates a measure of a risk of an accident on the respective route section to which the respective route risk parameter is assigned, and determining a total risk index of the driving route depending on the respective risk factor of the respective at least one route risk parameter which is assigned to the respective route section, wherein the total risk index indicates a measure of a risk of an accident on the driving route.

In some embodiments, the system or method for determining a risk of an accident on a driving route makes provision for at least one route risk parameter to be assigned to all or some route sections of the driving route. The route risk parameter contains a feature which is assigned to a route section and is relevant for a risk of an accident on the route section. From amongst the route risk parameters, a distinction is advantageously made between so-called static route risk parameters and so-called dynamic route risk parameters. Therefore, static risk parameters and dynamic risk parameters are stored in the memory device.

In some embodiments, the static route risk parameters contain an item of information which is relevant for road safety on a respective route section and is based on construction or topography. This includes, for example, the route course and the environment of a route section which may influence the probability of an accident on this route section.

The dynamic route risk parameters of a route section contain event-related items of information which are relevant for road safety on the respective route section. Said items of information are properties which prevail on a respective route section, in particular in a time-dependent manner. They include, for example, weather-related and traffic-related properties of a route section which influence the probability of an accident on this route section.

In some embodiments, the respective driving characteristics of a driver can be taken into account for calculating the total risk index of the driving route. The driving characteristics of the driver can be included in the calculation, for example, by a multiplier/factor with which the total risk indicator is rated. As a result, it is possible to take into account the probability with which a driver will more or less safely master specific hazards on a route section.

In some embodiments, route sections can be recalculated by avoiding route risk parameters in order to minimize the total risk index of a driving route. Therefore, for example, a new driving route between a start location and a destination location can be calculated, on which new driving route specific route risk parameters, such as turn-offs to the left or tight bend radii on the individual route sections for example, are not present or present only to a slight extent.

FIG. 1 shows, by way of example, a driving route FS between a start point A and a destination point B, which driving route has different route sections A1, A2, A3, . . . , An. The route section A1 is, for example, a bend with a specific bend radius. On the route section A2, the driving route between the start point A and the destination point B is crossed by another carriageway. On the route section A3, the driving route between the destination location A and the destination location B is crossed by a lane of other road users, for example by railroad tracks. The route section An has a winding route which runs through a wooded area before the destination location B is reached.

Figure 2:
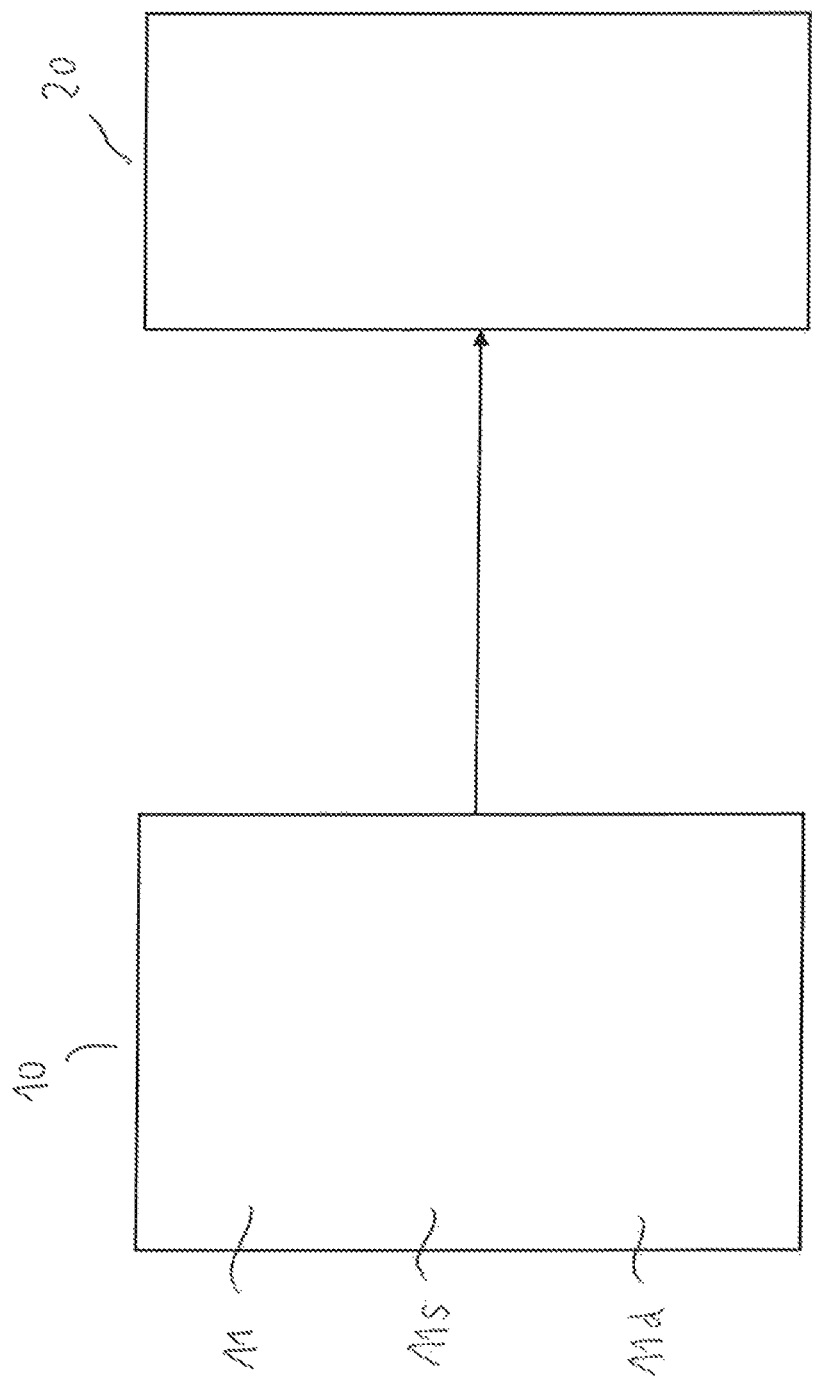
FIG. 2 shows components of a system for determining a risk of an accident on a driving route, the system incorporating teachings of the present disclosure.

FIG. 2 shows components of an example system 1 for determining the risk of an accident on the driving route FS. The system comprises a memory device 10 for storing route risk parameters 11 of the driving route FS. In this case, at least one of the route risk parameters 11 is assigned to each or at least some route sections A1, A2, A3, . . . , An of the driving route FS. Each route risk parameter 11 contains an item of information which is relevant for road safety on the respective route section A1, A2, A3, . . . , An. The memory device 10 can be located, for example, in a vehicle.

The system 1 furthermore comprises a computer device 20 for determining a respective (intrinsic) risk factor for each of the route risk parameters 11. In this case, the respective risk factor indicates a measure of a risk of an accident or probability of an accident on the respective route section A1, A2, A3, . . . , An of the driving route FS to which the respective route risk parameter 11 is assigned. The risk factor for a respective route risk parameter can be determined depending on a point in time at which the route section to which the respective route risk parameter is assigned is driven on and/or given or depending on a specific classification.

Furthermore, the computer device 20 is designed to determine a total risk index of the driving route FS depending on the respective risk factor of the respective at least one route risk parameter 11 which is assigned to the respective route section A1, A2, A3, . . . , An. The total risk index indicates a measure of a risk of an accident or probability of an accident on the driving route FS.

The computer device 20 can be located in a vehicle or in a central station or the backend of the system. Since a central computer in the backend generally has a higher computation power than a computer in a vehicle, complex calculations can be efficiently carried out in a shorter time in the backend. The results of the calculation can then be transmitted from the backend to a vehicle.

In some embodiments, the memory device 10 is designed, in particular, to store static route risk parameters 11$s$ and dynamic route risk parameters 11$d$. The static route risk parameters 11$s$ differ from the dynamic route risk parameters 11$d$ in that the respective item of information, which is relevant for road safety, of the respective static route risk parameter 11$s$ remains unchanged over a first time period, and the respective item of information, which is relevant for road safety, of the respective dynamic route risk parameter 11$d$ remains unchanged over a second time period, wherein the second time period is shorter than the first time period. This means that the static route risk parameters 11$d$ of a route section A1, A2, A3, . . . , An remain unchanged over a relatively long time period, while the dynamic route risk parameters 11$d$ of the route sections A1, A2, A3, . . . , An change in considerably shorter time intervals.

The static risk parameters 11$s$ can indicate, for example, properties of a route section which are based on the construction or based on the environment and are to be taken into account for a risk of an accident or a probability of an accident on the route section. The static risk parameters 11$s$ include, for example, items of information relating to a radius of a bend and/or tilting when traveling around a bend on a respective route section, items of information relating to an intersection including driving lanes on the respective route section or items of information relating to crossing of driving lanes by various road users, for example crossing of the driving route by railroad tracks or bicycle lanes, on the respective route section. Furthermore, the static risk parameters 11$s$ can contain items of information relating to a number of turn-offs required, in particular hazardous turn-offs to the left, on a respective route section. The static risk parameters 11$s$ furthermore include items of information relating to accident hotspots or warning signs on the individual route sections. Further static route risk parameters 11$s$ are, for example, wooded areas on a respective route section of the driving route.

The dynamic risk parameters 11$d$ contain items of information which are relevant for traffic safety of a respective route section based on events. Said items of information include, for example, items of information relating to the weather conditions prevailing on a route section at a specific time. Therefore, poor weather conditions, such as rain, snow or fog for example, which increase the risk of an accident on the respective route section, prevailing on a route section can be detected. Further dynamic route risk parameters 11$d$ are the frequency of wild animals crossing on a route section at a specific time of day or time of year and the current volume of traffic on the respective route section. As a result, for example, commuter traffic which takes place in the morning or in the evening on a specific route section can be taken into account. Therefore, for example, the risk of an accident on typical motorcycle routes in the summer can furthermore be included in the calculation of the risk of an accident on a route section.

In some embodiments, the computer device 20 is designed to determine the total risk index of the driving route FS depending on a time of day. As a result, it is possible to take into account that the risk of an accident on a driving route fluctuates depending on the time of day at which the driving route or the individual route sections on the driving route are driven on. For example, a route risk parameter of a route section can have a higher risk factor when driving at night than during the day.

Furthermore, the computer device 20 can be designed to determine the total risk index of the driving route FS depending on a time of year. For example, the risk factor of a route risk parameter for a route section through a wooded area can be rated to be higher in the autumn than at other times of the year since, in autumn, more leaves can fall from the trees onto the road and constitute a skid hazard. If yet another dynamic event, such as rainy weather for example, is added to the above, the risk factor can be temporarily increased further.

In some embodiments, the computer device 20 is designed to determine the total risk index of the driving route FS depending on the driving characteristics of a driver. As a result, the route risk parameters of the individual route sections of a driving route can be rated depending on the driving characteristics of a driver. Therefore, the risk factors of each route risk parameter can be adjusted depending on the driving characteristics of a driver.

In some embodiments, the computer device 20 can be designed to determine a different driving route if the total risk index of the driving route FS lies above a predefined threshold value. If, for example, it has been established that the driving route FS between the start point A and the destination point B determined by the system has an excessively high total risk index, the computer device 20 can determine an alternative driving route. The alternative driving route, which has a lower probability of an accident, can be determined by way of individual route sections on which specific route risk parameters, for example tight bend radii, prevail being deliberately avoided.

Figure 3:
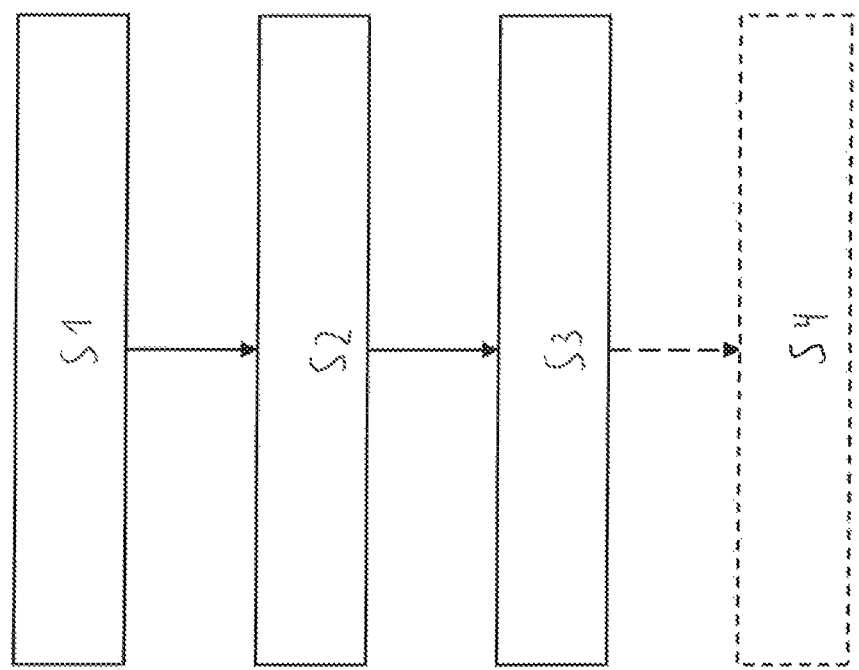
FIG. 3 shows a sequence of a method for determining a risk of an accident on a driving route, the method incorporating teachings of the present disclosure.

An example method for determining a risk of an accident on a driving route FS will be described below with reference to the sequence shown in FIG. 3. In a method step S1, the route risk parameters 11 of the driving route FS are stored in the memory device 10. They are stored in such a way that at least one of the route risk parameters 11 is assigned to all or at least some of the route sections A1, A2, A3, . . . , An of the driving route FS. As already described above, each of the route risk parameters 11 contains an item of information which is relevant for road safety on the respective route section A1, A2, A3, . . . , An.

Therefore, in method step S1, in particular the static route risk parameters 11$s$ and also the dynamic route risk parameters 11$d$ are stored in the memory device 10. The route risk parameters can be stored in a vehicle itself as well as in a central station/backend. In some embodiments, changing dynamic route risk parameters 11*d* may be stored in the backend, while the static route risk parameters which do not change in the longer term can be stored in the vehicle. In order to determine the risk of an accident on a driving route, the dynamic route risk parameters 11*d* can be called up from the backend, for example, by a navigation system of a vehicle.

In a method step S2, a respective (intrinsic) risk factor is determined for each of the dynamic route risk parameters 11*d*. This respective (intrinsic) risk factor indicates a measure of a risk of an accident or probability of an accident on the respective route section A1, A2, A3, . . . , An to which the respective route risk parameter 11 is assigned. The (intrinsic) risk factor of each route risk parameter can be determined in the backend system for a point in time given a specific classification.

The driving characteristics of a driver can optionally be included when calculating the risk factor of each route risk parameter. As a result, the risk factor for each route risk parameter is individually assigned to a driver or adjusted to the driving characteristics of a driver.

In a method step S3, a total risk index, which indicates a measure of a risk of an accident or probability of an accident on the driving route FS, is determined for the driving route FS. The total risk index is determined depending on the respective risk factor of the respective at least one route risk parameter 11 which is assigned to the respective route section A1, A2, A3, . . . , An. Therefore, in the method step S3, a prespecified route is compared with the present route risk parameters of the individual route sections and a consolidated risk parameter in the form of the total risk index for the calculated route taking into account the time at which the driving route is being driven on is output.

In an example method step S4, specific route sections of the driving route FS can be recalculated, wherein the route sections which are to be replaced are determined in such a way that specific route risk parameters on the route sections are avoided in order to thereby reduce the total risk index for the driving route FS.

The invention claimed is:

1. A system for navigating a vehicle based on a risk of an accident on a plurality of potential driving routes, the system comprising:
   a memory storing route risk parameters of each of the plurality of driving routes, wherein at least one of the route risk parameters is assigned to route sections of each driving route, wherein each of the route risk parameters contains information relevant for road safety on the respective route section;
   a processor in communication with the memory, programmed to determine a respective risk factor for each of the route risk parameters, wherein the respective risk factor indicates a measure of a risk of an accident on the respective assigned route section, wherein the respective risk factor depends at least in part on a personal driving characteristic of a driver;
   wherein the processor determines a total risk index of each driving route based on the respective risk factor of the respective at least one route risk parameter assigned to the respective route section, wherein the total risk index indicates a measure of a risk of an accident on the respective driving route;
   wherein the processor selects a driving route with a lowest risk index from among the plurality of driving routes, displays the selected driving route, and navigates a vehicle along the selected driving route.

2. The system as claimed in claim 1, wherein:
   the memory stores static route risk parameters and dynamic route risk parameters;
   the respective information of the respective static route risk parameter remains unchanged over a first time period; and
   the respective information of the respective dynamic route risk parameter remains unchanged over a second time period;
   wherein the second time period is shorter than the first time period.

3. The system as claimed in claim 1, wherein the static route risk parameters contain information relating to at least one parameter chosen from the group consisting of: a radius of a bend, an intersection, a number of turn-offs required, crossing of driving lanes by road users, accident hotspots, warning signs, and wooded areas in the respective route section.

4. The system as claimed in claim 1, wherein the dynamic route risk parameters contain information relating to at least one parameter chosen from the group consisting of: prevailing weather conditions, a frequency of wild animals crossing, and a current volume of traffic on the respective route section.

5. The system as claimed in claim 1, wherein the processor is programmed to determine the total risk index of the driving route depending on a time of day and/or on a time of year.

6. A method for navigating a vehicle based on a risk of an accident on a plurality of driving routes, the method comprising:
   storing route risk parameters of each of the driving routes in a memory, wherein at least one of the route risk parameters is assigned to route sections of each driving route, wherein each of the route risk parameters contains information relevant for road safety on the respective route section;
   determining a respective risk factor for each of the route risk parameters with a processor, wherein the respective risk factor indicates a measure of risk of an accident on the respective assigned route section, wherein the respective risk factor depends at least in part on a personal driving characteristic of a driver;
   determining a total risk index for the driving route based on the respective risk factor of the respective at least one route risk parameter assigned to the respective route section, wherein the total risk index indicates a measure of a risk of an accident on the driving route;
   selecting a driving route with a lowest risk index from among the plurality of driving routes;
   displaying the selected driving route; and
   navigating a vehicle along the selected driving route.

7. The method as claimed in claim 6, further comprising:
   storing static route risk parameters and dynamic route risk parameters in the memory;
   wherein the respective item of information of the respective static route risk parameter remains unchanged over a first time period; and
   wherein the respective item of information of the respective dynamic route risk parameter remains unchanged over a second time period;
   wherein the second time period is shorter than the first time period.

8. The method as claimed in claim 6, further comprising:
   determining the total risk index of the driving route depending on a driving characteristic of a driver.

* * * * *